United States Patent [19]
Davis

[11] Patent Number: 5,751,274
[45] Date of Patent: May 12, 1998

[54] FOOT-OPERABLE CURSOR CONTROL DEVICE

[76] Inventor: Michael Davis, 401 E. 74th St., New York, N.Y. 10021

[21] Appl. No.: 528,100

[22] Filed: Sep. 14, 1995

[51] Int. Cl.$^6$ ............................................. G09G 5/00
[52] U.S. Cl. ................................... 345/157; 345/184
[58] Field of Search .................... 345/156, 157, 345/167, 175, 184, 145, 159, 160, 161, 162; 395/80, 92

[56] References Cited

U.S. PATENT DOCUMENTS

| | | | |
|---|---|---|---|
| 4,275,611 | 6/1981 | Asher | 338/128 |
| 4,305,007 | 12/1981 | Hughes | 307/116 |
| 4,319,009 | 3/1982 | Asher | 200/275 |
| 4,349,708 | 9/1982 | Asher | 200/557 |
| 4,364,047 | 12/1982 | Archer | 324/660 |
| 4,459,578 | 7/1984 | Sava et al. | 345/161 |
| 4,469,330 | 9/1984 | Asher | 463/38 |
| 4,491,325 | 1/1985 | Bersheim | 463/38 |
| 4,520,242 | 5/1985 | Kopsho, Jr. | 200/6 A |
| 4,670,738 | 6/1987 | Weinblatt | 345/175 |
| 4,817,950 | 4/1989 | Goo | 200/6 A |
| 5,148,152 | 9/1992 | Stueckle et al. | 345/156 |
| 5,181,181 | 1/1993 | Glynn | 345/163 |
| 5,260,696 | 11/1993 | Maynard, Jr. | 345/163 |
| 5,283,555 | 2/1994 | Ward et al. | 345/156 |
| 5,329,276 | 7/1994 | Hirabayashi | 345/157 |
| 5,334,997 | 8/1994 | Scallon | 345/167 |
| 5,367,315 | 11/1994 | Pan | 345/156 |
| 5,552,807 | 9/1996 | Hayes et al. | 345/184 |

*Primary Examiner*—Kee M. Tung
*Assistant Examiner*—John Suraci
*Attorney, Agent, or Firm*—Cohen, Pontani, Lieberman, Pavane

[57] ABSTRACT

A device for selectively manipulating movement of a cursor on a computer display, as with the user's foot. The device comprising a housing, an elongated control stick member protruding through an opening defined in the top wall of the housing, and sensors for detecting movements of the bottom end of the control stick member. An annular guide member supports the control stick member in the housing for pivotable and longitudinally reciprocated motion under selective user control. A helical coil spring resiliently urges the control stick member longitudinally upward from the housing top wall to reposition the stick member after a user-initiated inward displacement.

16 Claims, 12 Drawing Sheets

FOOT-OPERABLE CURSOR CONTROL DEVICE

BACKGROUND OF THE INVENTION

1. Field of the Invention

This invention relates to remote input devices for a computer and, more particularly, to a foot-operable cursor control device for a computer display.

2. Description of the Prior Art

Cursor control devices are becoming an indispensable part of a computer system as more and more software developers create programs that are user-friendly and, usually, graphically-driven. A "cursor" is a graphical representation of a current position on a computer screen and may, for example, take the form of an arrow or a flashing bar or underscore. The cursor indicates where data may be input, such as the case of textual information, or where one may manipulate an object that is represented graphically on the computer display. The cursor may also be used to select or change modes of computer operation.

Early arrangements for controlling a cursor centered around the use of dedicated position control or directional arrow keys on the computer keyboard. These control keys were later augmented by other devices such as the light pen, graphics tablet, joystick, and the trackball. Other developments utilized a device, commonly referred to as a "mouse", to allow the user to directly manipulate the cursor position by moving a small, hand-held device across a flat surface such as a textured pad.

One type of mouse detects its motion via rotary motion of a trackball protruding from the bottom of its housing. As the operator moves the mouse on a two dimensional surface, sensors in the mouse detect rotation of the ball along two mutually perpendicular axes. Another type of mouse detects its motion using optical techniques. Typically, a mouse also includes on its housing a primary on/off switch which enables the operator to click or double-click to select an on-screen option or object and/or to manipulate an object displayed on the computer screen. Thus, the combination of the on/off switch and the motion sensing mechanism allows a user to manipulate a cursor single-handedly while controlling or instructing objects that appear on the screen.

In contrast, a joystick, or control stick, assembly is actuated by moving the control stick in a pivoted fashion. Sensors positioned proximate a bottom end of the control stick detect directional movements thereof along two mutually perpendicular axes. Various types of electromechanical mechanisms may be employed for this purpose. One variety of control stick operates by mechanically rotating the input shafts of a pair of potentiometers; the input shafts are oriented in mutually perpendicular relation to one another for measuring displacement components along two mutually orthogonal directions, i.e. the two Cartesian coordinate axes.

A second variety of control stick operates by mechanically engaging one or more digital or discrete sensing switches—such for example, as contact-type on/off switches—mounted proximate the lower end of the control stick. These sensing switches are positioned so that a relatively small, predetermined displacement of the lower end of the control stick causes one or more of the discrete switches to operatively actuate. Each sensing switch may be so electronically arranged that engagement of a particular switch causes the cursor to move along a preselected direction. Thus, the more such switches are included in the assembly, the more selectively manipulatable is the cursor by the operator. An example of such a control stick assembly is disclosed in U.S. Pat. No. 4,520,242 to Kopsho.

Other examples of sensing mechanisms for control stick assemblies may be found in U.S. Pat. Nos. 4,305,007, 4,364,047 and 4,459,578. U.S. Pat. No. 4,305,007 to Hughes discloses an electronic cursor control apparatus which detects, through variation of capacitances, the movement of a mechanical member such as a joystick relative to a control surface. U.S. Pat. No. 4,364,047 to Archer discloses a joystick switch having an electrode at its lower end. The joystick electrode electrically connects the control circuitry when a user pivots the joystick electrode onto one of several electrodes predeterminately located on a circuit board. Each electrode on the circuit board is responsive to a particular joystick position and, therefore, a particular cursor movement direction. U.S. Pat. No. 4,459,578 to Sava discloses a joystick device which utilizes a Hall-effect mechanism to control the cursor movement.

None of these prior art control stick device disclosures, however, either teaches or suggests a cursor movement device having a control stick that is both pivotable and depressible. Such a device would permit the user to both pivot the control stick to vary or determine the cursor position and depress the stick to "click" or engage a primary switch merely through manipulation of the stick. Further, these disclosed devices do not suggest their adaptation for ready operation by a user's foot.

There are several reasons that a user may productively use a computer input device that is foot-operable. In a text-editing environment, for example, the user may want or need to keep his hands on a keyboard while moving a cursor to select files or menu options. With conventional hand-operated control devices, however, the user is required to move his hands repeatedly between the keyboard and the control device during the course of his work; the user is likely to find such exercise distracting and inefficient. Similarly, a physically challenged user may be unable to effectively manipulate a hand-operable device with either of his hands; a foot-operable device is a virtual necessity to such users who wish to effectively utilize a graphical user interface.

In U.S. Pat. No. 5,334,997, Scallon discloses a foot-operable cursor control device. The device comprises a housing incorporating at least one foot-receiving well, along the bottom of which is mounted a trackball. The user's foot, through directional sliding-type manipulation of the trackball, may selectively direct an on-screen cursor through up-down and right-left movements in the manner of a conventional trackball or mouse. The housing which defines the foot-receiving well also incorporates a plurality of switches on the sidewalls. Each of the switches is spaced and separate and distinct from the trackball element, and is individually engageable by the operator's foot to "click" or otherwise operatively select on-screen items or to respond to prompts and the like. Thus, a user employing the device of Scallon must lift one's foot off of the trackball element to contact and actuate one of the switches and avoid inadvertent or unintended additional movement of the on-screen cursor as the foot moves forward or laterally to actuate the particular switch.

SUMMARY OF THE INVENTION

The present invention is directed to a device for manipulating movement of a cursor on a computer display. The device comprises a housing, a depressible and pivotable control stick member protruding through an opening of a top wall of the housing, and sensors located in the housing for sensing movement of the control stick member. The device further includes a resilient member for resiliently urging the control stick member upwardly from the top wall of the housing.

In operation, the control stick member is pivotally movable, in the general manner of a joystick, to correspondingly control the up-down and right-left movements of the screen cursor of a personal computer. In addition, the control stick is inwardly displaceable—i.e. toward or into the top wall of the housing generally along the axis of the control stick—a short distance, and may be self-centering. Inwardly depressing or displacing the control stick operates a switch which is intended to function as the primary button on a conventional mouse. i.e. for "clicking" or double-clicking or otherwise selecting an on-screen element or option.

In a preferred embodiment, the device further includes an annular guide member disposed at the opening for pivotably and slidably supporting the control stick member in the housing.

In another embodiment of the invention, the shaft portion of the control stick member is threaded in part. A helical coil spring is interposed between the top wall of the housing and the top end of the control stick member, the spring being annularly spaced around the control stick shaft. This embodiment further includes an annular adjustment dial having a threaded inside surface in threaded engagement with the control stick shaft; the dial advantageously permits user adjustment of the compression of the spring.

In still another embodiment, the annular guide member is resilient and has self-lubricating properties. The inner diameter of the annular guide member is so dimensioned that the shaft portion of the control stick member fits slidably therein. The resilient guide member also enables the control stick member to remain in its upright, neutral position during periods of non-use as well as permitting pivotal movement of the control stick member thereabout.

In yet another embodiment, the housing is wedge-shaped and supportable on a floor or underlying ground surface. The top end of the control stick member is dome-shaped and is appropriately sized and textured so as to frictionally receive the underside of the user's foot or shoe sole in a non-slip manner.

An advantage of the device over other foot-operable devices is that it can be used with many types of footwear, regardless of the size or style of the footwear—for example, sneakers or dress shoes, men's or women's.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not drawn to scale and, as such, are merely conceptual in disclosing the preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
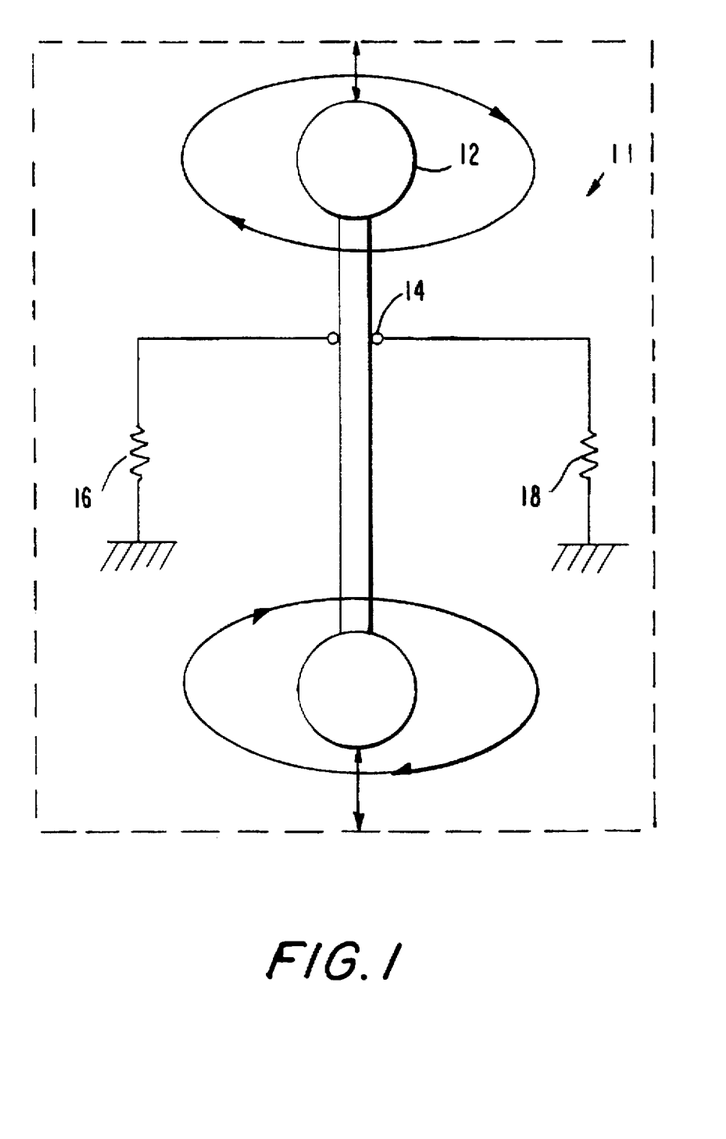
FIG. 1 is a schematic illustration of the control stick member of a foot-operable cursor control device in accordance with the present invention.

FIG. 1 schematically illustrates an embodiment of a control stick assembly 11 of a preferably foot-operable cursor control device 10 constructed in accordance with the present invention. As seen, the elongated control stick member 12 is both pivotable and inwardly depressible, and freely pivots and rotates about a point 14. In addition, the control stick 12 is resiliently supported by vertical spring elements 16, 18 so that the stick 12 is normally biased upwardly (in FIG. 1) along its unpivoted longitudinal axis.

Figure 2:
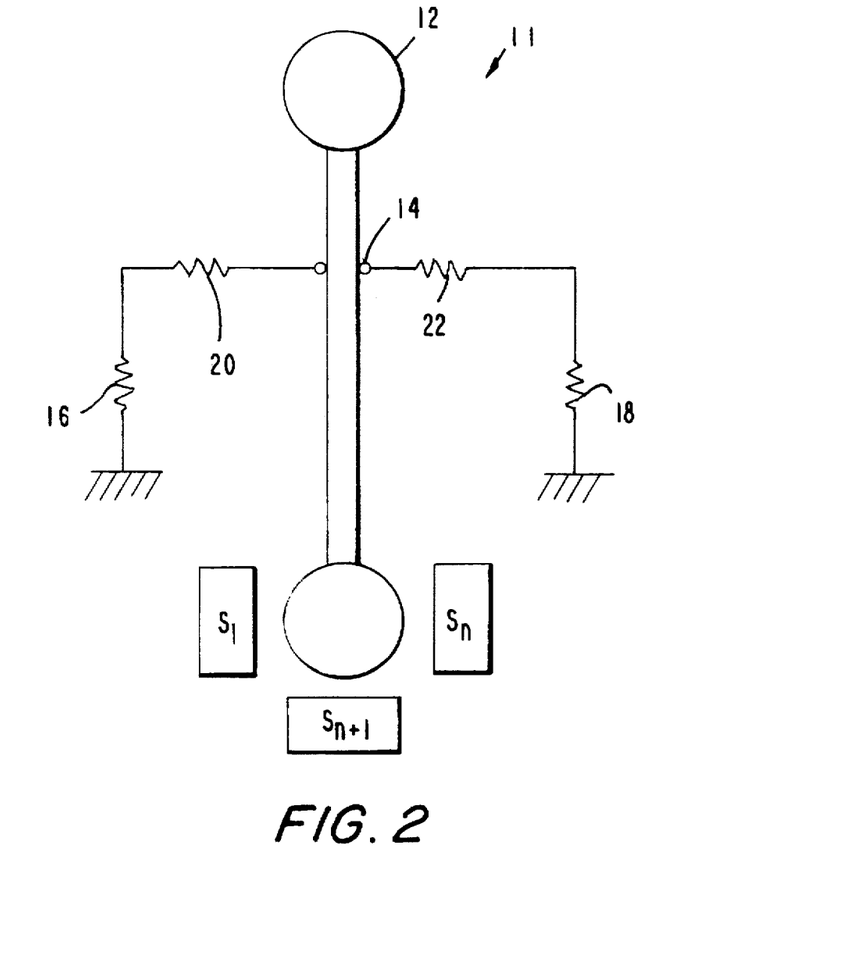
FIG. 2 is a schematic illustration of another embodiment of the foot-operable cursor control device of FIG. 1 with sensing elements disposed proximate a bottom end of the control stick member.

FIG. 2 depicts another embodiment of the control stick assembly 11 having horizontal spring elements 20, 22 which enable the control stick 12 to be self-centering. Further illustrated are motion sensors $S_1$ to $S_n$—analog or digital—for sensing directional displacements of the control stick 12 such, for example, as at or proximate the lower end of the control stick 12. Digital motion sensors may, by way of example, be implemented as simple on/off switches. Suitable analog sensors may include variable resistors, variable inductors, variable capacitors, and/or Hall effect elements.

Also shown in FIG. 2 is a sensor $S_{n+1}$ positioned proximate the tip of the lower end of control stick 12. Sensor $S_{n+1}$ senses or detects the downward axial movement of the control stick 12. The sensor $S_{n+1}$ may be the same as sensors $S_1$ to $S_n$, or different therefrom. Sensor $S_{n+1}$ may be employed by a user to indicate a command action much in the way that a user of a conventional mouse "clicks" a separate primary switch on the mouse.

Figure 2A:
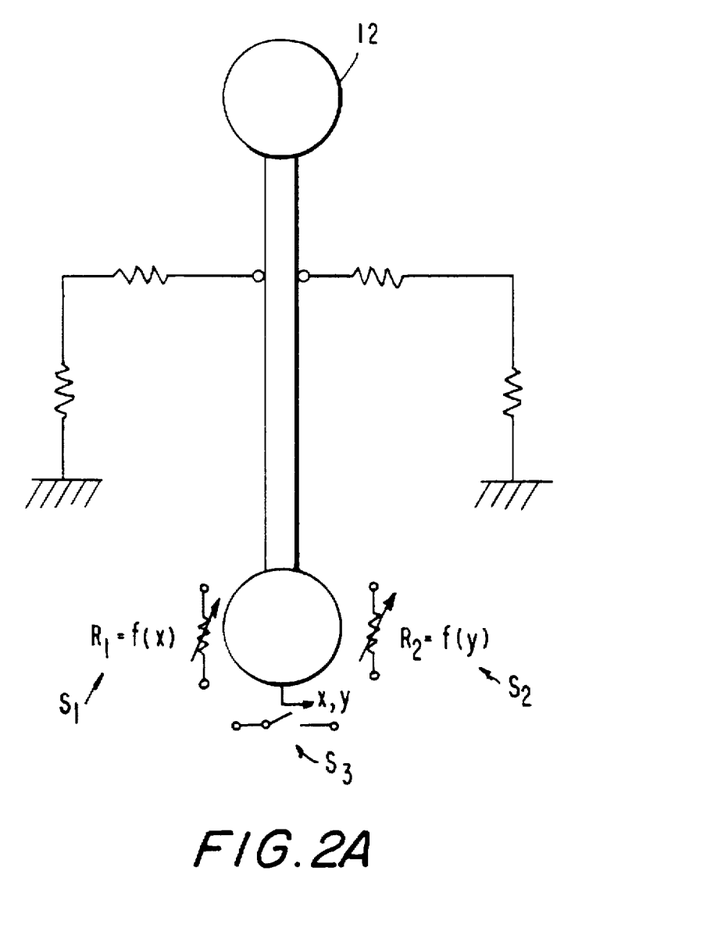
FIG. 2A is a schematic representation of a modified embodiment of FIG. 2 using variable resistors.

An arrangement incorporating variable resistor type displacement sensors and a momentary on/off switch is shown in FIG. 2A.in which elements $R_1$ and $R_2$ represent potentiometers or the like having variable resistances. $R_1$ is arranged so that its resistance varies with a first component of displacement of the control stick along direction X (i.e.

$R_1=f(X)$); the resistance of $R_2$, on the other hand, varies with a second displacement component of the control stick 12 such, for example, along direction Y (i.e. $R_2=f(Y)$). Directions X and Y represent orthogonal displacement components that are readily describable by the Cartesian coordinate system.

Figure 2B:
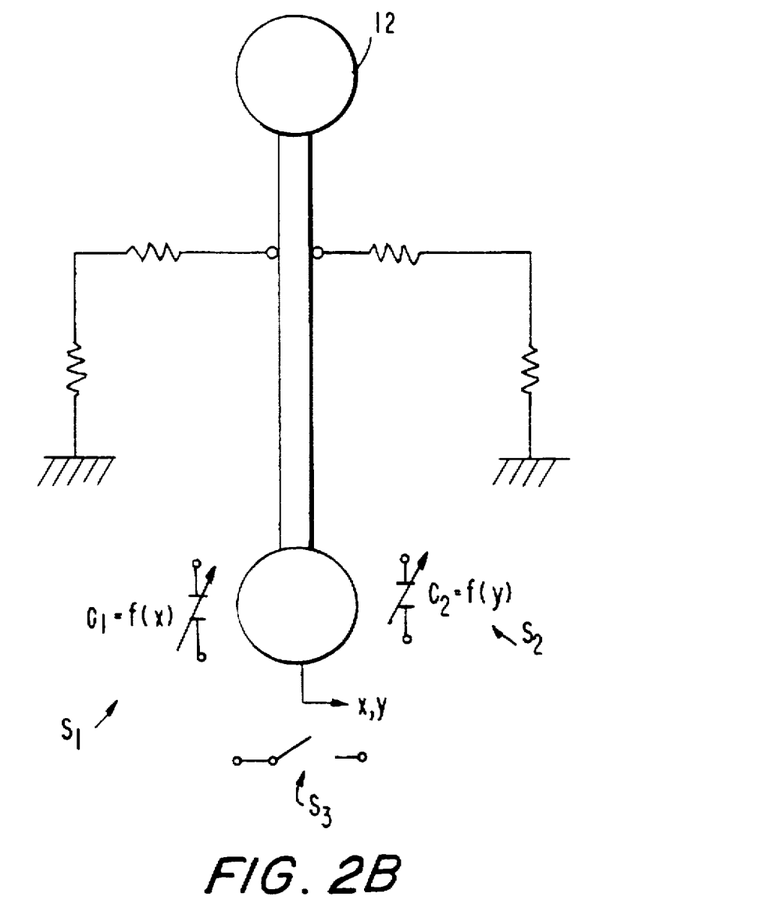
FIG. 2B is a schematic representation of another modified embodiment of the device of FIG. 2 using variable capacitors.

FIG. 2B schematically depicts an arrangement of sensors incorporating variable capacitors $C_1$ and $C_2$. As with the variable resistors of FIG. 2A, capacitors $C_1$ and $C_2$ may be so arranged that their capacitances predeterminately vary with the orthogonal components of displacement, X and Y of control stick 12. Thus, $C_1=f(X)$ and $C_2=f(Y)$.

Figure 2C:
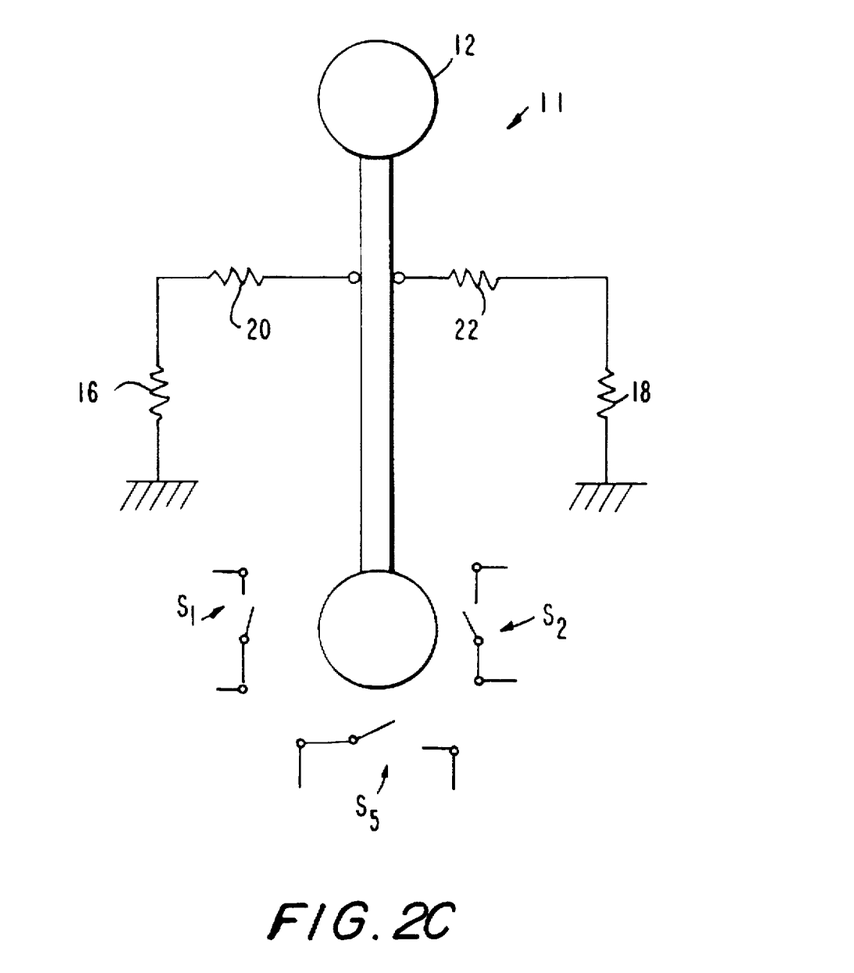
FIG. 2C is a schematic representation of yet another modified embodiment of the device of FIG. 2 using digital or on/off switches.

FIG. 2C illustrates the use of digital switches or sensors $S_1$ to $S_4$ ($S_3$ and $S_4$ are not shown). The switches may be of the on/off type, and are preferably configured so that each switch is responsive, as through actuating engagement, to a predetermined movement of control stick 12. Thus, for example, actuation of switch $S_1$ produces a signal representative of movement of control stick 12 in the negative direction along the X axis, and actuation of switch $S_2$ produces a signal representative of movement in the positive direction along the X axis. Similarly, switches $S_3$ and $S_4$ provide signals representative of control stick movement in the respective positive and negative directions along the Y axis.

Figure 3:
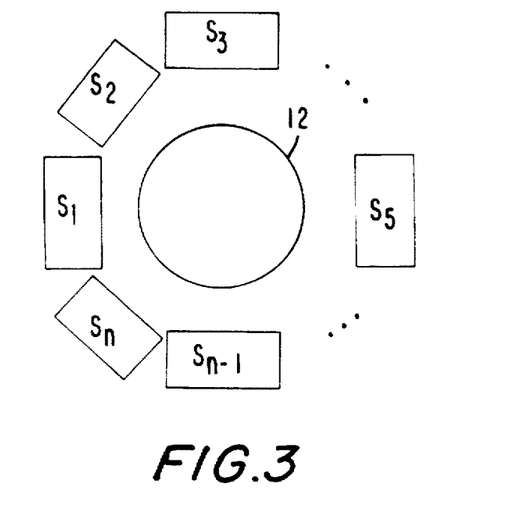
FIG. 3 is a schematic top view depicting the spatial arrangement of the sensing elements in the device of FIG. 2.

FIG. 3 depicts a further spatial arrangement of digital motion sensors $S_1$ to $S_n$. The advantage of providing a greater number of digital sensors will be apparent to persons of ordinary skill—that is, because the angular range of coverage or detection of each sensor is decreased, the ability to identify a particular direction of control stick pivotal movement becomes more refined. As a result, the cursor can be moved through a wider selection of angular motions. As shown in FIG. 3, each sensor is preferably selectively positioned about the lower end of the control stick 12 along a generally circular path.

Figure 4A:
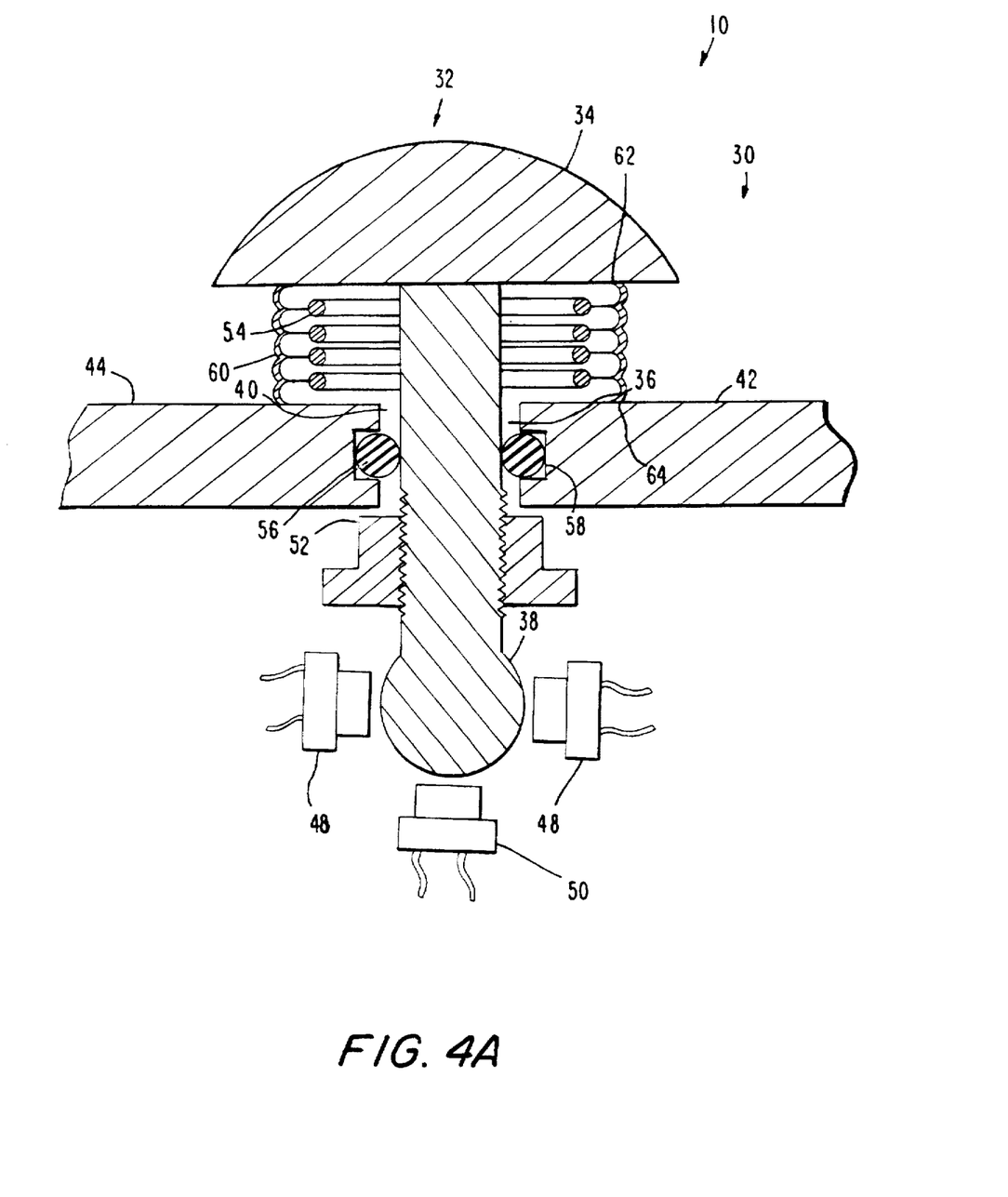
FIG. 4A is a partially-sectioned side view of an embodiment of the foot-operable cursor control device of FIG. 2 using on/off switches.

With reference now to FIG. 4A, there shown is a sectional view of a preferred embodiment of the control stick assembly 30 of a foot-operable cursor control device 10 constructed in accordance with the present invention. The assembly 30 comprises a control stick 32, a helical coil spring 54, an annular guide member 56, an annular adjustment dial 52, a bellows 60, a plurality of digital directional sensors or switches 48 (only two of which are shown), and a primary switch 50.

The control stick 32 has a top end 34, a shaft portion 36, and a bottom end 38. A portion of stick 32 protrudes outwardly through an opening 40 defined in the top wall 42 of a housing 44 of the cursor control device 10, so that the top end 34—which is preferably dome-shaped—is disposed for user access externally of the housing 44. The top surface of the dome-shaped top end 34 may be textured and/or rubberized for non-slip contact engagement with a user's foot or shoe; numerous arrangements and materials for providing such textured or otherwise non-slip surfaces are well-known in the art.

The lower or under surface of top end 34 is preferably flat or otherwise so configured for abutting contact with one end of the helical coil spring 54. The control stick shaft 36 may be threaded along a portion of its elongation for mated engagement with the threaded inner annular surface of the adjustment dial 52 so as to permit user adjustment of the compression of spring 54. The bottom end 38 of control stick 32 is dimensioned and shaped to facilitate operative detection by or engagement with directional motion sensors 48. Where contact-type on/off switches are employed, as shown in FIG. 4A, then control stick bottom end 38 may have a generally bulbous form. The bottom end 38 will also be sized and shaped such that a predetermined amount of angular and/or translational displacement of the control stick 32 selectively engages one or more of the switches 48, 50. Thus, for example, while depressing the control stick 32 to cause its bottom end 38 to engage the primary switch 50, a user may separately or concurrently pivot the bottom end 38 to engage one or more of the directional switches 48.

The coil spring 54 is disposed annularly about shaft 36 and captively interposed between the lower surface of control stick top end 34 and the opposed top or outer surface of housing top wall 42. By virtue of its annular relation with control stick 32, coil spring 54 provides the control stick 32 with a self-centering capability. The spring force exerted coil spring 54 may be linear (i.e constant stiffness) or non-linear (varying stiffness); it will be appreciated that a non-linear spring which varies in stiffness relative to the degree of compression will enable the user to selectively adjust the requisite force for "clicking" or engaging the primary switch disposed beneath control stick 32.

The annular guide member 56 advantageously permits the control stick 32 to both pivot in the manner of a conventional joystick and move inwardly and axially along its longitudinal axis to simulate a depressible button switch. In the preferred embodiment depicted in FIG. 4A, the guide 56 is implemented as an "O-ring" fabricated of a polymer material having self-lubricating properties so as to accommodate substantially frictionless movement of the shaft 36 relative to the guide 56. In addition, the polymer material preferably renders the guide 56 elastically deformable yet sufficiently tough that pivoting motion of control stick 32 does not overcompress the polymer or cause it to collapse. An exemplary material is polytetrafluoroethylene or Teflon™. Guide member 56 may be further held or captured at the top wall 42 by a groove or slot 58 formed in the inner surface defining the opening 40, the groove 58 being suitably shaped and dimensioned for this purpose.

It is contemplated that, instead of being a polymer ring, the annular guide member 56 may include ball bearings and/or ball-bearing-type bushings. The ball bearings may be set in a compliant raceway so as to accommodate the pivoting action of control stick 32.

The control stick assembly 30 may further comprise a bellows-like boot 60 formed about the helical coil spring 54 to prevent dust or dirt from entering housing 44. As shown, the boot 60, like the spring 54, is interposed between the top end 34 of control stick 32 and the top wall 42 of housing 44, and may be fabricated of an elastomer such, for example, as rubber. Preferably, the boot 60 is pre-compressed so that its end faces 62, 64 sealingly engage the corresponding opposed surfaces of the control stick top end 34 and housing 44.

It will be appreciated that the opening 40 is selectively dimensioned to accommodate the full range of pivoting and sliding motions of the control stick 32 that are necessary to activate the sensors or switches 48, 50.

Figure 4B:
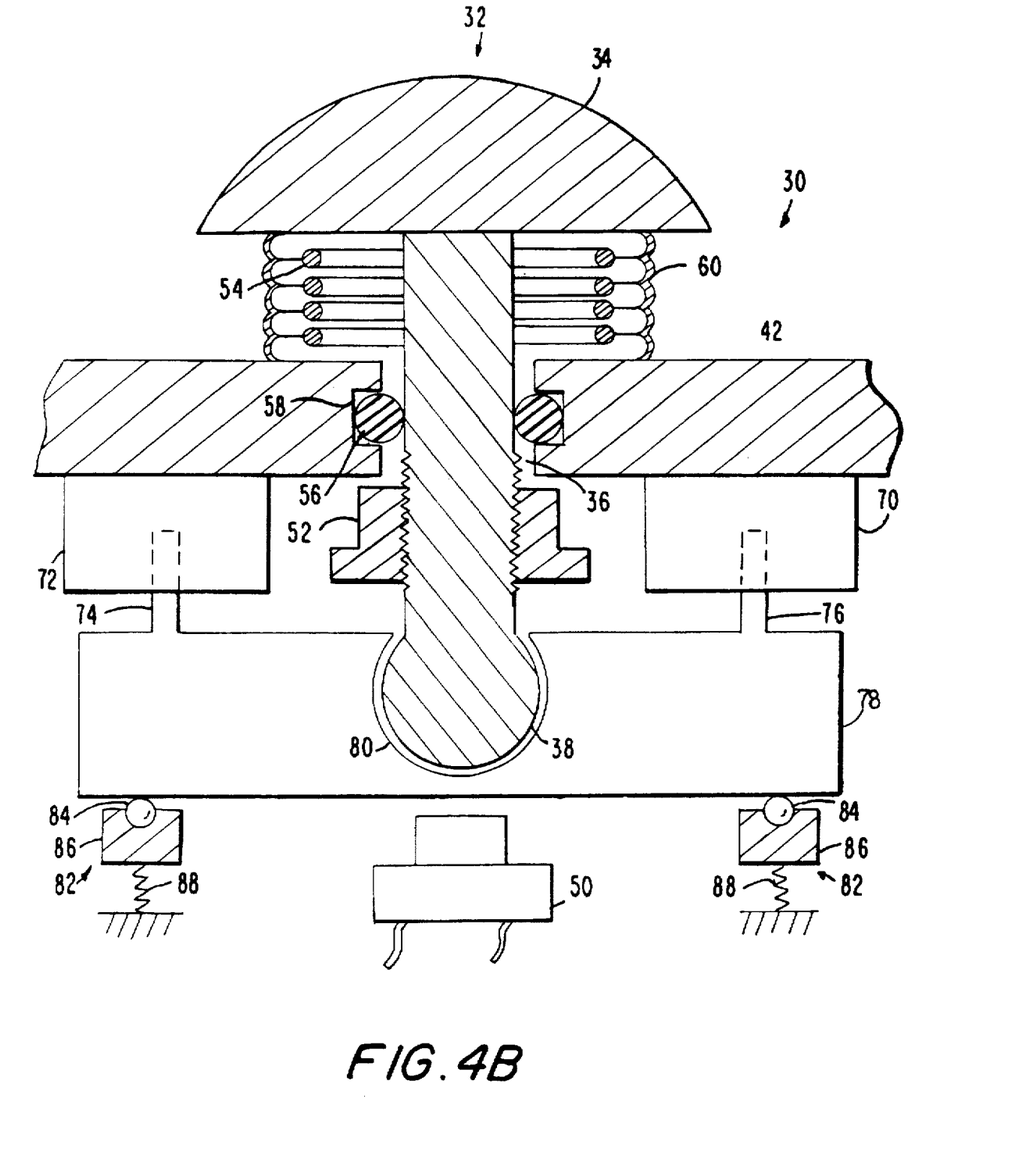
FIG. 4B is a partially-sectioned side view of another embodiment of the foot-operable cursor control device of FIG. 2 using potentiometers.

Depicted in FIG. 4B is a further embodiment of the inventive foot-operable cursor control device 10 in which, as distinguished from the implementation of FIG. 4A, variable resistances or potentiometers 70, 72 secured to the interior surface of the housing top wall 42 are employed as directional sensors. The potentiometers are coupled to a transfer plate 78 through coupling arms or members 74, 76 which project outwardly from the plate 78.

As seen, transfer plate 78 is slidably or rollingly supported by plate support members 82 for movement of plate 78 along a generally horizontal plane substantially parallel to the interior surface of the top wall 42. Transfer plate 78 is also resiliently mounted or biased so that it remains substantially horizontal when control stick 32 is not inwardly depressed and to avoid unintended engagement with and activation of the primary switch 50. The support members 82, as depicted in FIG. 4B, comprise a ball bearing 84, a raceway 86, and a resilient biasing member such, for example, as a spring 88. It is also contemplated that the support members may also or additionally include a slidable surface for contact with plate 78 and having self-lubricating properties such as are provided, for example, by polytetrafluoroethylene or Teflon™.

Each of the potentiometers 70, 72 is oriented to detect a respective orthogonal displacement component of the transfer plate 78. Plate 78 incorporates a socket-like depression 80 sized to rotatably receive the ball-shaped bottom end 38 of control stick 32 such that pivoting motion of the control stick 32 causes transfer plate 78 to correspondingly move along a substantially horizontal plane. It is of course contemplated that other rotatable connecting joints may alternatively be used to attach plate 78 to control stick 32.

Figure 4C:
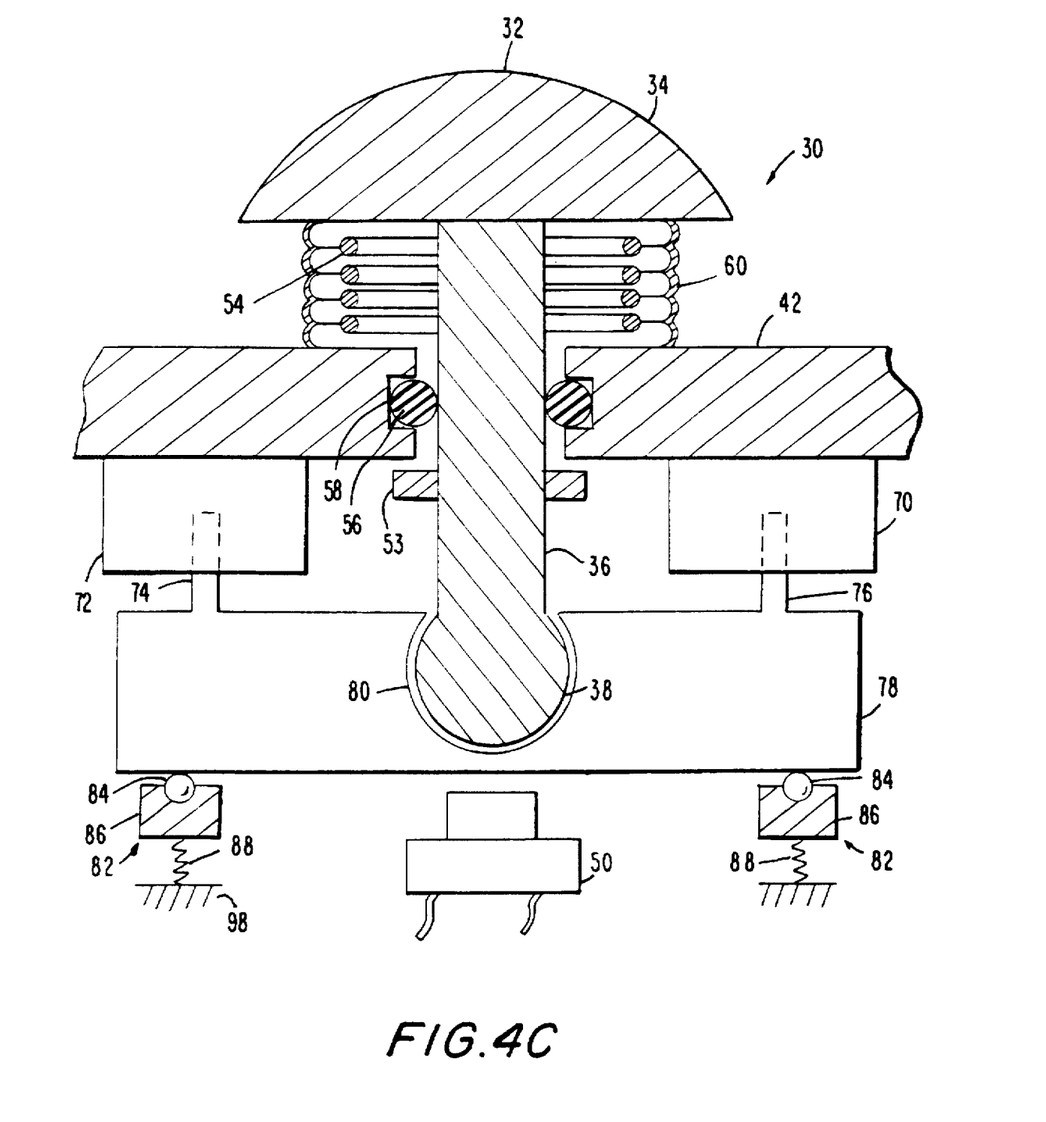
FIG. 4C is a partially-sectioned side view of still another embodiment of the foot-operable cursor control device of FIG. 2 using a fixedly pre-compressed spring.

In still another modified embodiment, shown in FIG. 4C, the selective adjustability of the compression of spring 54 is eliminated as by replacement of the adjustment dial 52 of FIGS. 4A and 4B with a retaining ring 53 carried on the shaft 36 of control stick 32. This embodiment, which otherwise has the same constructions as that of FIG. 4B, offers reduced manufacturing cost as compared to the embodiment of FIG. 4B.

Figure 4D:
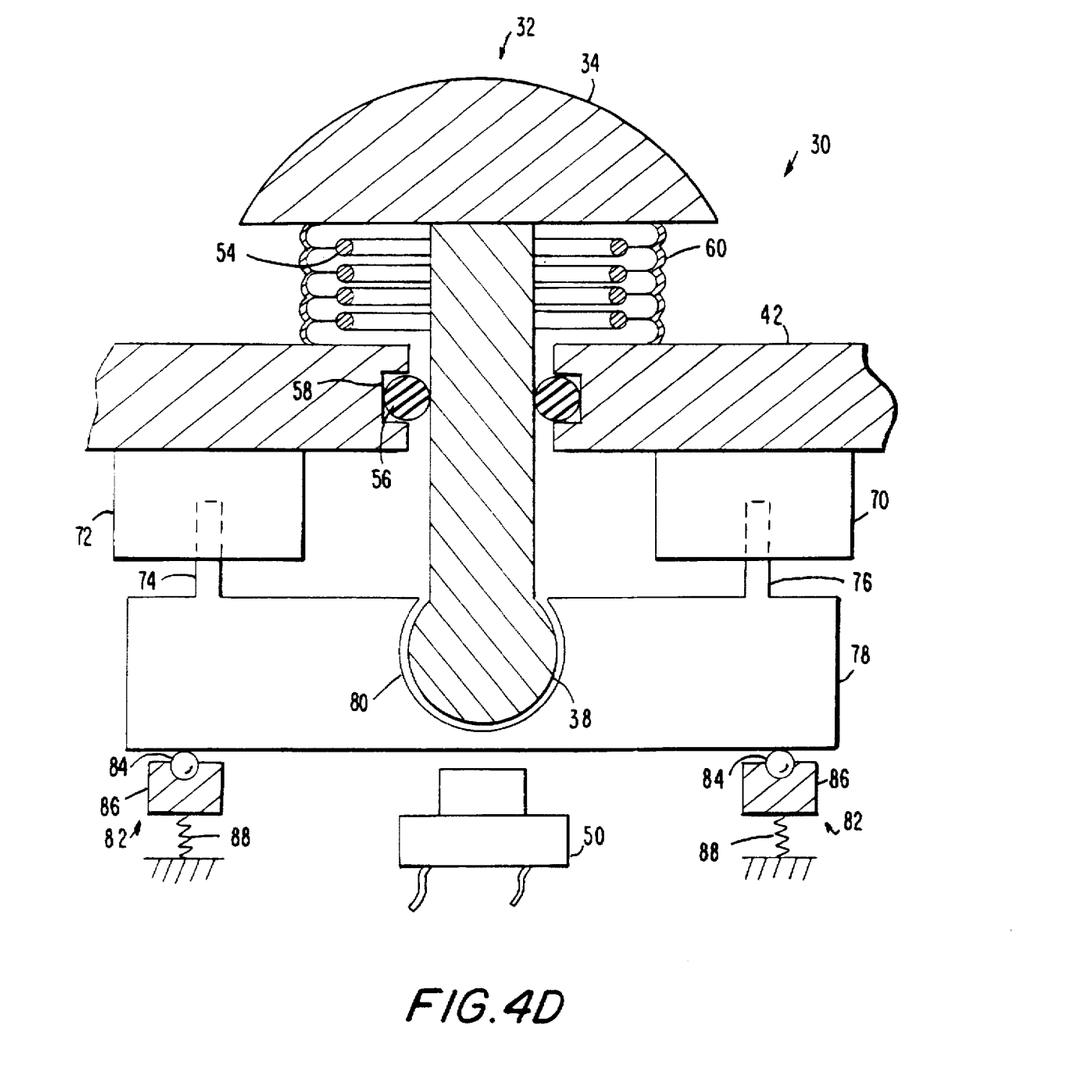
FIG. 4D is a partially-sectioned side view of yet another embodiment of the foot-operable cursor control device of FIG. 2 using an uncompressed spring.

FIG. 4D represents yet another form of the inventive control stick assembly 30. Here, no adjustment dial or retaining device is provided for precompressing coil spring 54. The assembly is nevertheless fully operable by the user to effect both the pivotal and depressible movements of the control stick 32 as described hereinabove.

Although not shown, the spring 54 may also be mounted within, rather than outside of, the housing 44 by securing it to the interior surface of the housing top wall 42. The control stick 32 may then be attached to the spring 54 by way of a retaining ring and/or any other suitable means or constructions. In this modification, depression of the control stick 32 causes extension, rather than compression, of spring 54.

Figure 5:
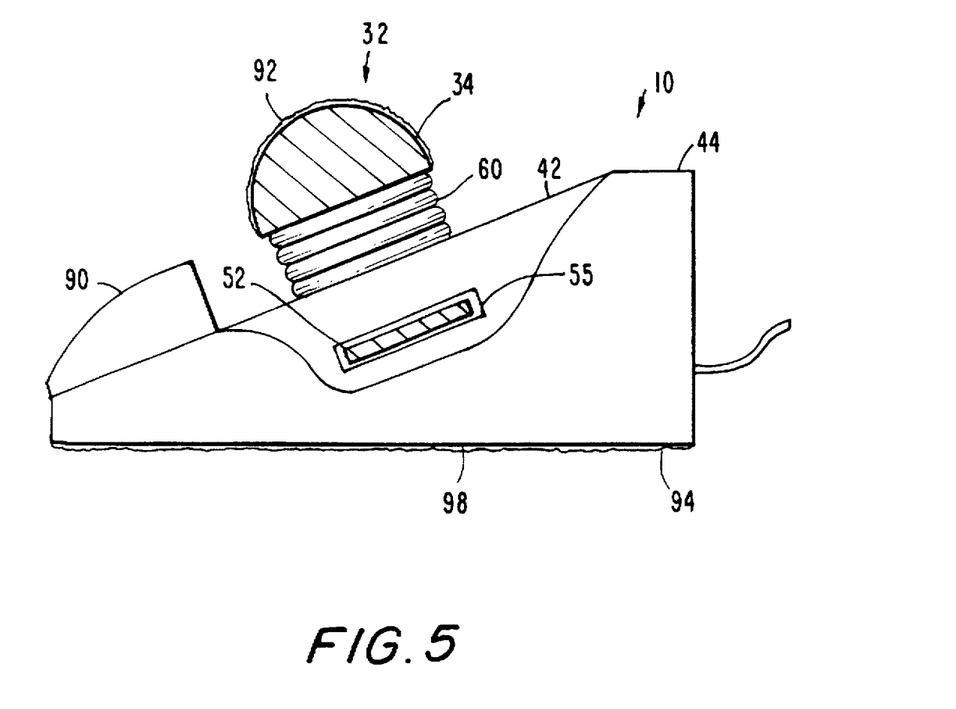
FIG. 5 is a side view of the foot-operable cursor control device of FIG. 4A.

FIG. 5 depicts a side view of a preferred form of the inventive foot-operable cursor control device 10, in which housing 44 is generally wedge shaped. The housing top wall 42 is inclined upwardly from housing bottom wall 98 to facilitate user-initiated and controlled manipulative movements of the control stick 32 by the user's foot. A foot-rest 90 may be secured to the top wall 42 so that the user may pivot his foot thereon while engaging the top end 34 of control stick 32. The side wall of cursor control device 10 may be contoured and narrowed proximate control stick 32 to facilitate access to the adjustment dial 52 which protrudes from an aperture 55. Aperture 55 is preferably dimensioned to accommodate movements of the dial 52 as the control stick 32 pivotally moves. With the dial 52 protruding from housing 44, the user is readily able to adjust the precompression of the spring 54 without disassembly of the housing 44.

The top end 34 of control stick 32, shown in FIG. 5, may have a coated surface 92 that is textured to provide frictional traction with the user's foot or shoe. The bottom surface 94 of housing 44 may be similarly textured to provide like traction between the cursor control device 10 and an underlying support surface or floor. These textured surfaces 92, 94 may, for example, be formed of a rubber-like coating.

Figure 6:
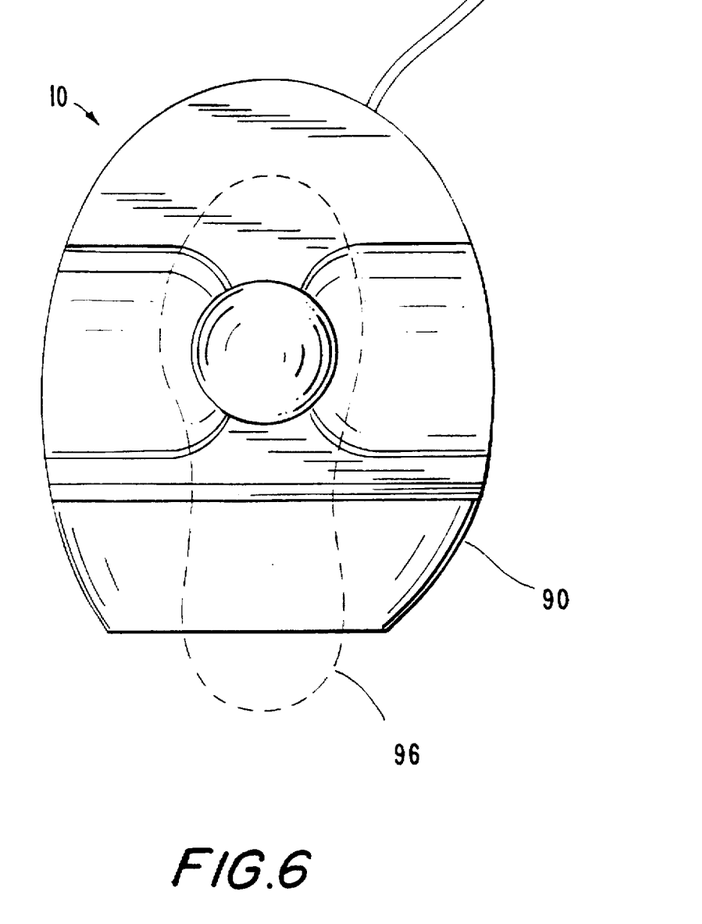
FIG. 6 is a top view of the foot-operable cursor control device of FIG. 5.

FIG. 6 is a top view of the device of FIG. 5, in which the broken lines represent a user's foot or shoe 96 operatively positioned atop the cursor control device 10. Although shown there as larger than the user's foot or shoe, it will be appreciated that the size of the foot-operable cursor control device 10, as well as its shape, may be selectively varied as general matters of design choice and to accommodate the preferences or needs of individual users.

The wiring and/or electrical components (not shown) conventionally used for interfacing the inventive foot cursor control device 10 with a host computer may be incorporated in the device 10, in the host computer, and/or in a peripheral enclosure physically separate from the device 10 and host computer, again as a general matter of design choice. Such wiring and components and the associated interface software for use with the device 10, are well known in the art.

In operation, the device 10 is preferably positioned on the floor adjacent the computer with which it is to be used, and the user's foot is disposed supportedly thereon as shown in FIG. 6. The user may selectively tilt or pivot the control stick 32 of the device 10 with his foot so as to correspondingly move the cursor about the computer screen. The user may further select a menu option, and/or perform any other action normally associated with the activation of a mouse or trackball button, by depressing or "clicking" the control stick 32. In addition, the user may "grab" an object on the screen and move it from one position to another by concurrently depressing and pivoting the control stick 32.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A foot-operable device for selective user displacement and control of a cursor on a computer display, comprising:

a housing defining an interior chamber and having a top wall oriented and configured for receiving a user's foot in at least partially-supported relation on said top wall and a bottom wall, said top wall including an opening defined in and through said top wall and communicating with said chamber;

an axially-elongated control stick having a top end and a longitudinally-opposite bottom end and extending through said opening so that said bottom end is disposed in said chamber and said top end projects outwardly from the housing interior through said opening, said control stick being supportedly coupled to said housing for pivotal movement of said control stick relative to said housing so as to move said bottom end in directions substantially transverse to the control stick axis in response to selective user-manipulated axially-transverse movements of the control stick top end and for axial translation of the control stick relative to the housing so as to move the control stick bottom end toward said housing bottom wall in response to selective user-manipulated depression of the control stick top end toward said housing top wall from a first, untranslated position of the control stick to a second, inwardly-depressed position of the control stick, and said control stick top end being disposed for contact with a user's foot so that user-initiated selective movements of a user's foot are transferrable to said top end for selectively transversely moving and axially translating the control stick;

biasing means disposed between said housing top wall and said control stick for resiliently urging said control stick top end in a direction axially away from said top wall so as to return the control stick from said second position to said first position following user-manipulated depression of the control stick top end; and sensing means in said chamber for detecting pivotal movements and axial translations of said control stick.

2. A foot-operable device in accordance with claim 1, further comprising guide means disposed at said housing opening for supportedly coupling said control stick to said housing for transverse pivotal movement and axial translation of the control stick relative to said housing.

3. A foot-operable device in accordance with claim 1, wherein said biasing means comprises a helical coil spring disposed about a portion of said control stick.

4. A foot-operable device in accordance with claim 3, wherein said coil spring comprises a non-linear coil spring.

5. A foot-operable device in accordance with claim 1, wherein said biasing means comprises a spring connected between said housing top wall and said control stick top end.

6. A foot-operable device in accordance with claim 2, wherein said guide means comprises a resilient annular member, and wherein said housing top wall defines a groove proximate said opening for receiving at least a portion of said annular member.

7. A foot-operable device in accordance with claim 6, wherein said annular member is formed of a polymer material having self-lubricating properties.

8. A foot-operable device in accordance with claim 1, wherein said control stick top end is dome-shaped for facilitating movement-transferring contact of a user's foot with the control stick.

9. A foot-operable device in accordance with claim 1 wherein said control stick further comprises a shaft portion connecting said top and bottom ends, said device further comprising operable means on said shaft portion for adjusting said biasing means for selective variation of said resilient urgency of the biasing means.

10. A foot-operable device in accordance with claim 9, wherein said control stick is threaded at said shaft portion, and wherein said adjusting means comprises a threaded annular dial for threaded engagement with said control stick shaft portion and user-adjustable through rotation of said dial relative to said shaft portion for adjusting said biasing means.

11. A foot-operable device in accordance with claim 1 wherein said control stick further comprises a shaft portion connecting said top and bottom ends, said device further comprising a retaining ring engaging said shaft portion and said biasing means being disposed between said housing top wall and said retaining ring.

12. A foot-operable device in accordance with claim 1, wherein said sensing means comprises at least a sensor operable by said control stick for detecting pivotal movements of the control stick, and a switch operable by said control stick for detecting axially inward depressions of the control stick.

13. A foot-operable device in accordance with claim 12 further comprising a transfer member carried on said control stick proximate said bottom end for operative contact with said sensor to operate said sensor in response to pivotal movements of the control stick.

14. A foot-operable device in accordance with claim 13, wherein said sensor comprises a variable resistor operable by said transfer member for predeterminately varying a resistance in accordance with pivotal movement of the control stick.

15. A foot-operable device in accordance with claim 12, wherein said switch is disposed in said housing between said control stick bottom end and said housing bottom wall for operation of said switch by said control stick bottom end.

16. A foot-operable device in accordance with claim 1, wherein said housing top wall is oriented at a predetermined, non-parallel, angular inclination to the bottom wall for comfortably accommodating a user's foot in at least partially-supported relation on said top wall.

* * * * *